United States Patent [19]
Hornfeck et al.

[11] Patent Number: 5,315,865
[45] Date of Patent: May 31, 1994

[54] CAPACITIVE TURN ANGLE INDICATOR

[75] Inventors: Rudiger Hornfeck, Betzenstein; Klaus Bar; Josef Nagler, both of Lauf; Manfred Barth, Wildbad/Calmbach, all of Fed. Rep. of Germany

[73] Assignees: Diehl GmbH & Co., Nuremberg; Borg Instruments Verwaltung-GmbH, Remchingen, both of Fed. Rep. of Germany

[21] Appl. No.: 910,776

[22] Filed: Jul. 8, 1992

[30] Foreign Application Priority Data

Jul. 20, 1991 [DE] Fed. Rep. of Germany ....... 4124160

[51] Int. Cl.$^5$ .......................................... G01M 19/00
[52] U.S. Cl. ..................................... 73/118.1; 341/15
[58] Field of Search ................. 73/118.1, 116, 119 R; 33/1 PT; 341/15; 361/287; 340/870.37; 318/662

[56] References Cited

U.S. PATENT DOCUMENTS

| 3,259,895 | 7/1966 | Knox | 341/15 X |
| 3,337,789 | 8/1967 | Ono et al. | 340/870.37 X |
| 4,382,250 | 5/1983 | Radaelli | 73/118.1 X |
| 4,477,810 | 10/1984 | Tanaka et al. | 341/15 X |

FOREIGN PATENT DOCUMENTS

| 0004764 | 10/1979 | European Pat. Off. . |
| 2817544 | 11/1978 | Fed. Rep. of Germany . |
| 2937248 | 6/1980 | Fed. Rep. of Germany . |
| 0171562 | 2/1986 | Fed. Rep. of Germany . |
| 3538455 | 4/1986 | Fed. Rep. of Germany . |
| 3640110 | 7/1987 | Fed. Rep. of Germany . |
| 3744256 | 7/1988 | Fed. Rep. of Germany . |
| 3716464 | 12/1988 | Fed. Rep. of Germany . |
| 3821083 | 1/1989 | Fed. Rep. of Germany . |
| 3923042 | 1/1991 | Fed. Rep. of Germany . |
| 4034991 | 5/1992 | Fed. Rep. of Germany . |
| 2144589 | 2/1973 | France . |

*Primary Examiner*—Jerry W. Myracle
*Attorney, Agent, or Firm*—Scully, Scott, Murphy & Presser

[57] ABSTRACT

A turn angle indicator or angular displacement indicator and, more particularly, relates to a capacitive turn angle indicator, especially a positioning sensor for a flap or throttle valve, including a supporting plate fastened to the apparatus at a close narrow distance in front of a further supporting plate which is rotatable planar-parallel relative thereto and which is utilized for a mutually oppositely located narrow spoke or sector-shaped electrode pattern, and with a bearing structure for the rotatable supporting plate and which is fastened to the apparatus. The supporting plates are guided relative to each other through the intermediary of compressively-loaded distance spacers which are arranged in the region of the outer edges of the plates which extend in parallel with the axis of rotation of the rotatable plate.

12 Claims, 2 Drawing Sheets

CAPACITIVE TURN ANGLE INDICATOR

BACKGROUND OF THE INVENTION

1. Field of the Invention

The present invention relates to a turn angle indicator or angular displacement indicator and, more particularly, relates to a capacitive turn angle indicator, especially a positioning sensor for a flap or throttle valve, including a supporting plate fastened to the apparatus at a close narrow distance in front of a further supporting plate which is rotatable planar-parallel relative thereto and which is utilized for a mutually oppositely located narrow spoke or sector-shaped electrode pattern, and with a bearing structure for the rotatable supporting plate and which is fastened to the apparatus.

2. Discussion of the Prior Art

An angular displacement or turn angle indicator has become known from the disclosure of German Laid-Open Patent Appln. No. 29 37 248. The rotatable shaft of the movable electrode supporting plate thereof is supported in the bottom of a cup-shaped housing, and extends freely through the stationary electrode supporting plate which is fastened to the housing and which serves as a housing cover. This shaft is turned by the component, whose momentary position is intended to be measured by means of a capacitive analysis of the degree of overlapping by the sector-shaped electrodes, in that; for instance, there is directly measured the resulting capacitance or the magnitude of an alternating current which passes this reactance. Since in any event, the capacitance which enters into the measurement also depends upon the spacing between the electrodes, and during rapid rotational movements or during bending loads acting on the shaft this is neither constant over a period of time or over the circumference of the supporting plates, then for obtaining a reduction in the influence of spacing-dependent errors, there should be selected the largest possible spacing between the electrodes. This results in inaccuracies due to lower capacitances, which can only be compensated for by electrodes which are wide in the direction of movement; in essence, through large overlapping surfaces From this, there is finally obtained the result that the capacitive turn angle indicator of the type considered herein does not allow for the attainment of a large angular resolution and at only a limited accuracy. However, on the other hand, the latter is necessary when, for instance, for the electronically supported control over the function of an internal combustion engine there should not only be determined the flap or throttle valve position (for instance, for a carburetor or fuel injection system) with regard to specified, constructively available end positions; having reference to German Patent Specification 36 40 110, but there is to be directly evaluated the movement of the throttle valve in a precise angular resolution.

SUMMARY OF THE INVENTION

In recognition of these conditions, it is an object of the present invention to construct a turn or rotational angle indicator of the type considered herein in such a manner to enable the indicator over a broad temperature range and also after being subjected to extreme mechanical loads or stresses, to be capable of attaining a digital angular information with a high degree of resolution and a good constance in accuracy at a construction which is easily and simply manufactured and which is nevertheless compact in size.

The foregoing object is inventively attained through a turn angle or angular displacement indicator of the type considered herein, in that the supporting plates are guided relative to each other through the intermediary of compressively-loaded distance spacers which are arranged in the region of the outer edges of the plates which extend in parallel with the axis of rotation of the rotatable plate.

In accordance with the foregoing object, intermediate the supporting plates consisting of an electrically-insulating, mechanically highly-stressable material, such as glass or ceramic, which are provided for a fine spoke-shaped electrode structure, and for the receipt of the evaluating electronics system in the center of the supporting plate which is installed fastened to the housing, there is provided a distancing or spacer support structure, which is arranged as an axially-loaded friction or roller bearing located in the edge region of the supporting plates; at a separate construction of a radial friction or roller bearing in proximity to the rotor axis when, behind the edge region of the supporting plates there is no provision for a combined roller member-bearing for the assumption of axial as well as radial forces, and which is designed for the introduction of a minimally permissible axial play.

The foregoing objects of the invention provide for a constant remaining accuracy over a broad spectrum of operating temperatures for the entire life expectancy of the arrangement.

BRIEF DESCRIPTION OF THE DRAWINGS

Additional modifications and advantages, as well as further features of the invention can now be more readily ascertained from the following detailed description of exemplary embodiments of the inventive structure, taken in conjunction with the accompanying drawings; in which.

DETAILED DESCRIPTION

Figure 1:
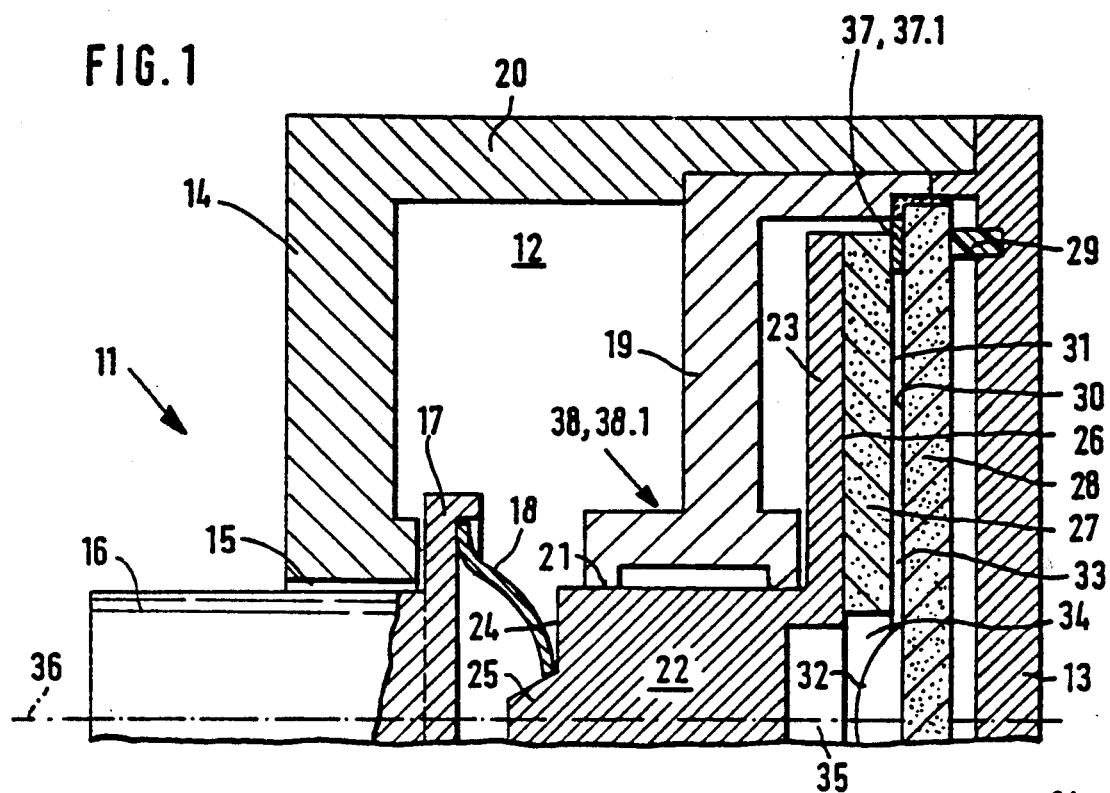
FIG. 1 illustrates, in a fragmentary longitudinal half-sectional view, the turn angle or angular displacement indicator including supporting plates which are axially pressed against each across a distancing or spacer ring, and a centrifugal radial friction bearing for the shaft end of the rotor.

The illustrated capacitive turn angle or angular displacement indicator 11 hereby possesses an essentially cup-shaped housing 12 of an inherently stable, mechanically and thermally highly stressable material having a low thermal coefficient of expansion; for instance, such as generally, brass or a corresponding plastic material. This housing is hermetically sealed for protection against dust and splash or spray water by means of a cover 13 adhesively attached, brazed or welded thereto. In the bottom 14 of the housing, a through-opening 15 serves for the centrifugal or rotatable support of an input shaft 16, which is insertable into the housing from the cover opening until it supports itself by means of an encompassing flange 17 against the housing bottom 14. Arranged opposite thereto and secured against rotation on the flange 17 is a calotte-like convexly-curved spring plate 18.

Similarly, extending from the cover opening, a bearing retainer 19 is inserted into the housing 12 until it axially contacts against a projection formed in the housing wall 20 or against the bottom 14, and is secured against rotation within the housing 12. In the exemplary embodiment of FIG. 2, the bearing retainer 19 is constructed in two parts in that in front thereof there is additionally installed a support ring 19a which is fastened to the housing.

Engaging into the bearing aperture 21 which is coaxial with the through-extending opening 15, is the freely rotatably supported shaft end 22 of a rotor 23. The end surface of the shaft 24 comes into contact with the cap region of the spring plate 18, whose central opening is passed through in a close fit by a profiled burl 25 on the shaft end surface 24, so as to render it possible to achieve the transmission of an axially spring-supported rotational moment or torque from the input shaft 16 through the spring plate 18 to the rotor 23. The rotor is equipped at its forward end surface 26 in close connection or form-locking mode with a movable supporting plate 27 which; for example, is adhesively fastened, such as being glued, brazed or welded thereto. Parallel in front thereof, a stationary supporting plate 28 has the rim region thereof fastened directly or through the intermediary of bearing retainer 29 which is fastened to the apparatus, adhesively, brazed or welded to the housing 12. In accordance with this described assembly for the angular displacement indicator 11, which is carried out in this sequence, expediently from the standpoint of manufacture, the cup-shaped housing is then sealed off by means of the cover 13, with the interposition of a stiff-elastic distance spacer 29 extending to the front side of the stationary supporting plate 28.

The stationary supporting plate 28 carries on its rear surface 30, and with this surfacing facing towards the front surface 31 of the rotatable supporting plate 27, a narrow-small sector shaped or spoke-like pattern 10 of electrodes and structures of conductor paths, which are applied through sputtering, galvanic or etching processes, as is well known from the manufacturing technology employed with regard to liquid-crystal display cells. In accordance with the rotational position of the movable supporting plate 27 relative to the electrode pattern on the fixed or stationary supporting plate 28, there are obtained different capacitive values which are dependent upon the extent of overlapping; for example, which are determined by means of a current measurement in an integrated circuit 32 located in the center of the rear surface 30 of the supporting plate 28 which is fastened to the apparatus. Projecting beyond the axially small narrow spacing 33 between the supporting plates, the encapsuled switching circuit extends into the region of the thickness of the movable supporting plate 27, which possesses a central cutout 34 for this reason, behind which, as required, there connects also a recess 35 in the rotor 23 and its shaft end 22. With respect to a preferred electrode geometry and an advantageous circuit for the evaluation of the positionally-dependent capacitance value of this angular displacement indicator 11, reference is made to the copending German Patent Applns. P 40 34 991.8 filed Nov. 3, 1990 and P 41 00 556.2, filed Jan. 10, 1991, both of which are assigned to the common assignee of the present application.

A large angular resolution by the indicator requires extremely narrow spoke-shaped electrodes so that the largest possible overlapping of a pair of electrodes of the two plates 27, 28 produces only relatively small common projection surface. On the other hand, for the most possibly undisturbed electrical current interrogation of the momentary capacitive value; in effect, the momentary angular position in the overlapping, there is intended to be obtained a highest possible capacitance. As a consequence thereof, the close spacing 33 between the plates 27, 28 must be maintained as small as possible, inasmuch as the capacitance of a plate condenser, as is known, is directly proportional to the overlapping surface and inversely proportional to the spacing between the plates, with the therebetween arranged dielectric material as the proportionality factor. However, therewith the constancy of this spacing 33 is extremely critical. The constance in the spacing is in particular not readily afforded when the movable supporting plate 27 rotates rapidly, or in essence, is quickly accelerated or braked down, inasmuch as uncontrollable tumbling movements will then superimpose themselves on the rotational movement which percentually can constitute a large portion of the effective reference spacing 33. However, this situation is not permissible, inasmuch as the effects of errors of such a magnitude would render unusable the measured angular results. Additionally, there must be considered that due to thermal influences the supporting plate 27 can displace itself radially and especially axially relative to the other supporting plate 28, which can bring along further detrimental effects on errors with regard to the overlap-dependent value in the capacitance.

In order to be able to control these effects from errors, above all with respect to the play obtained in the spacing parallel to the axis of rotation 36, a distance or spacing retainer 37 is located either directly or indirectly intermediate the supporting plates 27 and 28. The spacing retainer extends radially as to remotely as possible from the axis of rotation 36, in order to attain the greatest possible degree of effectiveness for the suppression of tumbling movements of the free edge of especially the movable supporting plate 27. This spacing retainer 37 can be designed as an axial sliding or friction bearing 37.1 in the shape of a spacer ring consisting of a hard material, such as steel or copper-beryllium, as is indicated in FIG. 1. In the event that there are employed lubricants possessing a good thermal conductivity in order to avoid abrasions, these expediently fill also the open space of the distance 33 between the plates and resultingly act as an electrically-insulating and capacitance-increasing dielectric medium. The axial friction bearing 37.1; however, can also be dimensioned as an axially thin and radially wide ring plate of a foil, whose abrasive-resistant material then concurrently serves as a dielectric medium between the pattern 10 of the capacitor electrodes. As a radial bearing 38 for the rotatable supporting plate 27; in essence, the shaft end 22 of its rotor 23, pursuant to the embodiment of FIG. 1 there is provided a friction bearing 38.1, and pursuant to FIG. 2 a roller bearing 38.2 at (relative to the radius of the supporting plate 27) the closest possible distance to the axis of rotation 36. In both instances, the axial positioning against the spacer retainer 37 is carried out by pressing the rotor 23 by means of the spring plate 18 which is supported fastened to the housing. The axial spacer retainer 37 is produced, in accordance with FIG. 2, by a quantity of roller members 37.2 which are arranged in the region of the outer edge of the supporting plates 27, 28 behind thereof intermediate the rotor 23 and a bearing retainer-support ring 19a so as to be radially non-supportive. The roller members 37.2 can overall each possess a larger diameter than the spacing 33 which is to be ensured by them when they are not located directly between the plates 27, 28, but when the spacing 33 is obtained through the mutual arrangement of the support surfaces. Into these there can be machined running grooves 42 for the friction-less guidance of the roller members 37.2, as is well known from the ball bearing technology.

Figure 2:
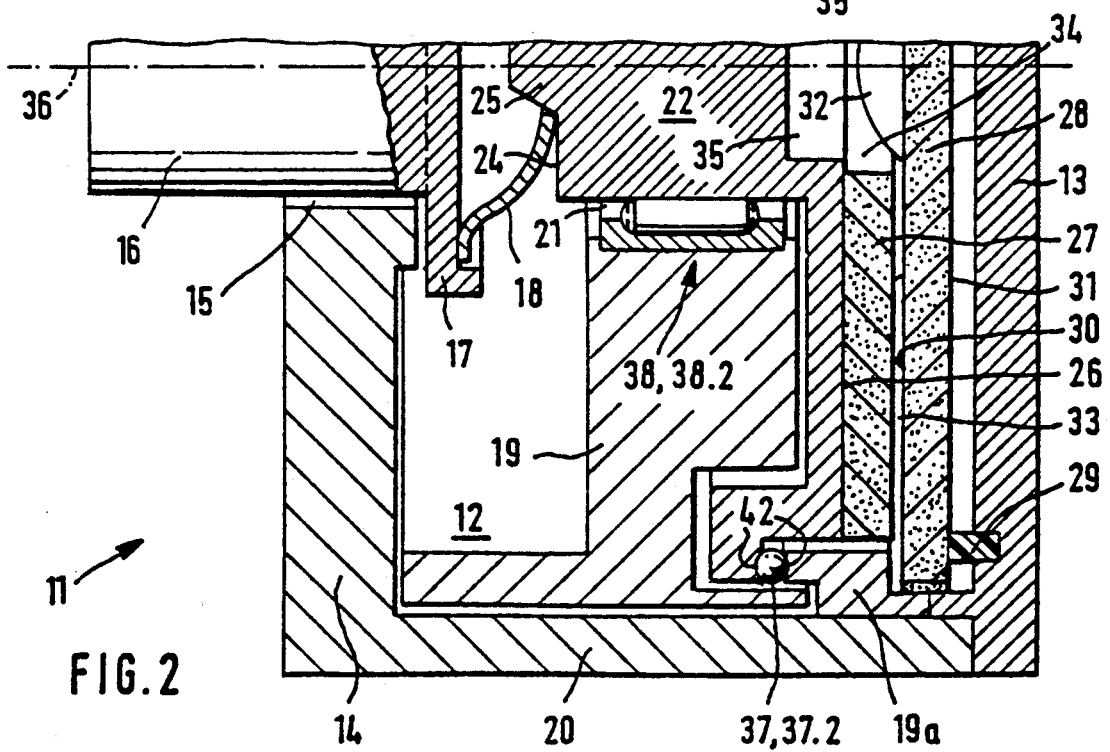
FIG. 2 illustrates a view similar to FIG. 1, showing separate roller bearings for the axial positioning of the supporting plates ahead of each other and for the radial retention of a shaft end for the rotor.
Figure 3:
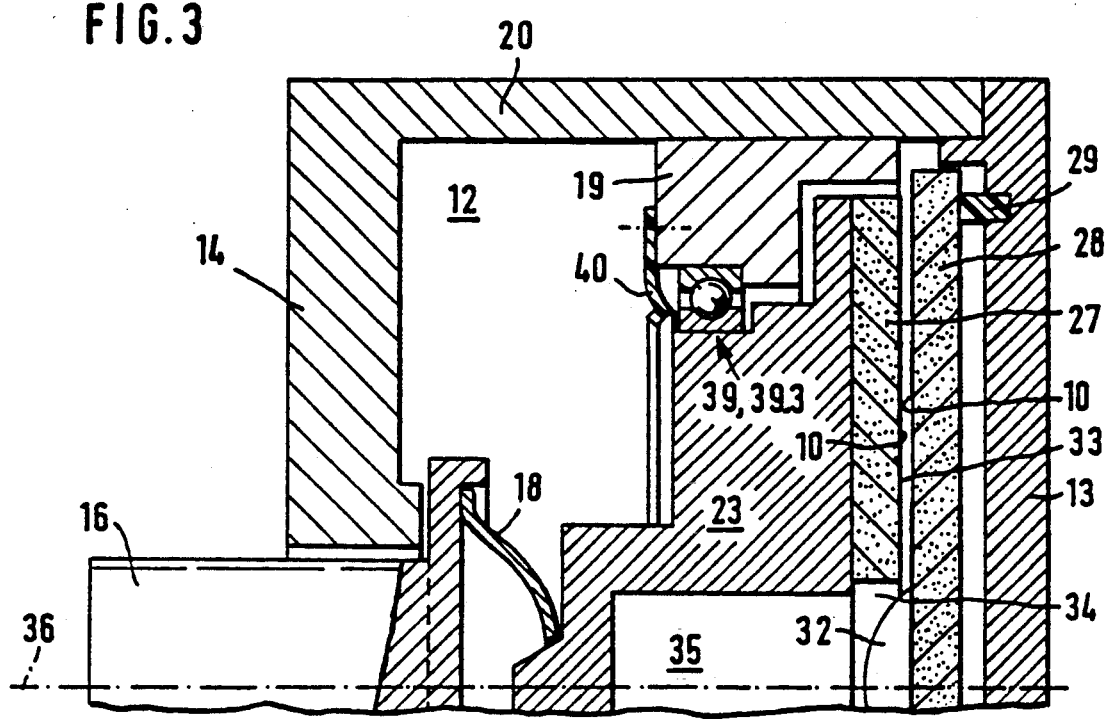
FIG. 3 illustrates a view similar to FIG. 1, showing a radial ball bearing for the rotor which concurrently also assumes the axial positioning thereof.
Figure 4:
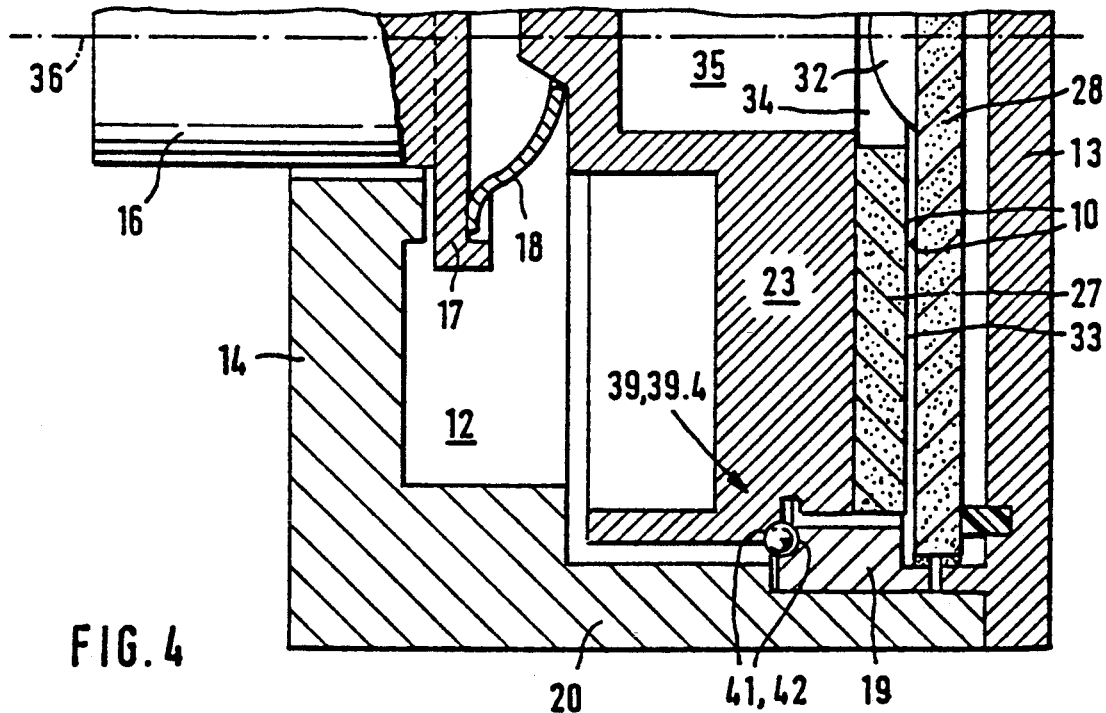
FIG. 4 illustrates in a view similar to that of FIG. 1, an inclined ball bearing which is located behind the outer edge region of the supporting plates.

In the modified exemplary embodiments pursuant to FIG. 3 and pursuant to FIG. 2, relative to the supporting plates 27, 28, the outwardly located axially supporting spacer retainer 37 and the inwardly located radial bearing 38, are combined into an outwardly located radial-axial bearing 39, which is radially outwardly more or less distant from the axis of rotation 36, at an otherwise essentially similar construction for the angular displacement indicator 11 as is described with regard to FIGS. 1 and 2. According to FIG. 3, this combined bearing 39 is constructed as a caged grooved ball bearing or tapered ball bearing 39.3 with sufficient axial load components; if desired covered towards the opening by a protective ring 40. The combined bearing 39 pursuant to FIG. 4 is a tapered journal bearing 39.4 with roller member in the shape of balls or rollers which are retained in a cage, or in the interest of a larger quantity thereof, inserted cageless in suitable concave ring-shaped profiles 41 as the running grooves 42, which are machined into the outer edge of the rotor 23 and into the inner edge of the oppositely located bearing retainer 19. Nevertheless, such combined radial-axial bearings 39 must be especially precisely dimensioned since, for example, thermally-caused radial expansions of the rotor 23 over the tapered journal support can also result in an axial play and thereby in fluctuations in the spacing between the supporting plates 27, 28, which are to be avoided; and at a corresponding sloping and cross-sectional geometry for the ring profile 41, this coupling in the effects between the radial and axial play can, however, be controlled, and then evidences the advantage in that there can be assured an extremely precise spacing 33 between the plates at a significantly smaller installation volume than, on the one hand, through radially mutually offset, separate axial spacer retainers 37, and on the other hand, radial friction or roller bearings 38.

What is claimed is:

1. Capacitive angular displacement or turn angle indicator, comprising a stationary supporting plate fastened to an apparatus; a movable supporting plate which is rotatable in plan-parallel relationship with said stationary supporting plate being a close spacing therefrom, said plates including oppositely located narrow sector-shaped electrode pattern; a bearing means for the rotatable supporting plate being fastened to the apparatus; and compressively-stressed spacer retainer means in the region of the outer rims of said supporting plates and extending in parallel with the axis of rotation for said movable supporting plate guiding said plates relative to each other.

2. An indicator as claimed in claim 1, wherein said spacer retainer means comprises a bearing spacer ring located intermediate said supporting plates.

3. An indicator as claimed in claim 2, wherein the space between said supporting plates within the confines of the spacer ring are filled with a dielectric medium serving as a lubricant.

4. An indicator as claimed in claim 1, wherein said spacer retainer means comprises a foil which is arranged intermediate the carrier plates.

5. An indicator as claimed in claim 1, wherein said spacer retainer means comprises roller members arranged in the edge region of said plates either directly or indirectly between the supporting plates.

6. An indicator as claimed in claim 5, wherein the roller members are radially guided within running grooves.

7. An indicator as claimed in claim 1, wherein radial friction or roller bearing means offset from the radial position of the spacer retainer means towards the center of said indicator support a rotor which is equipped with said rotatable supporting plate.

8. An indicator as claimed in claim 1, wherein a combined radial-axial roller bearing is radially outwardly offset relative to the axis of rotation.

9. An indicator as claimed in claim 8, wherein the combined radial-axial roller bearing is configured as a grooved-tapered ball bearing having a minimal axial play.

10. An indicator as claimed in claim 1, wherein one of the two supporting plates which are supported against each other has a surface configuration forming said spacer retainer means such that the required spacing between said plates is directly implemented through the application of a force.

11. An indicator as claimed in claim 1, mounted as a setting sensor for a flap valve.

12. An indicator as claimed in claim 1, mounted as a setting sensor for a throttle valve.

* * * * *